United States Patent [19] [11] Patent Number: 4,795,274
Gu [45] Date of Patent: Jan. 3, 1989

[54] FOIL BEARING

[75] Inventor: Alston L. Gu, Rancho Palos Verdes, Calif.

[73] Assignee: Allied-Signal Inc., Morris Township, Morris County, N.J.

[21] Appl. No.: 83,762

[22] Filed: Aug. 10, 1987

[51] Int. Cl.$^4$ .............................................. F16C 17/04
[52] U.S. Cl. .................................................. 384/106
[58] Field of Search ................. 384/106, 103, 104, 105

[56] References Cited

U.S. PATENT DOCUMENTS

| 3,375,046 | 3/1968 | Marley . |
| 3,382,014 | 5/1968 | Marley . |
| 3,615,121 | 10/1971 | Barnett et al. . |
| 3,635,534 | 1/1972 | Barnett . |
| 3,677,612 | 7/1972 | Barnett et al. . |
| 3,747,997 | 7/1973 | Winn . |
| 3,809,443 | 5/1974 | Cherubim . |
| 3,893,733 | 7/1975 | Silver et al. . |
| 4,082,375 | 4/1978 | Fortmann . |
| 4,153,315 | 5/1979 | Silver et al. . |
| 4,167,295 | 9/1979 | Glaser . |
| 4,171,928 | 10/1979 | Emerson . |
| 4,178,046 | 12/1979 | Silver et al. . |
| 4,227,752 | 10/1980 | Wilcock . |
| 4,227,753 | 10/1980 | Wilcock . |
| 4,247,155 | 1/1981 | Fortmann . |
| 4,262,975 | 4/1981 | Heshmat et al. . |
| 4,274,683 | 6/1981 | Gray et al. . |
| 4,277,111 | 7/1981 | Gray et al. . |
| 4,277,112 | 7/1981 | Heshmat . |
| 4,296,976 | 10/1981 | Heshmat . |
| 4,475,824 | 10/1984 | Glaser et al. ......................... 384/106 |
| 4,552,466 | 11/1985 | Warren ................................ 384/103 |

Primary Examiner—Lenard A. Footland
Attorney, Agent, or Firm—Albert J. Miller; David B. Abel

[57] ABSTRACT

A fluid film foil bearing having a resilient trailing edge support.

2 Claims, 1 Drawing Sheet

U.S. Patent   Jan. 3, 1989   4,795,274
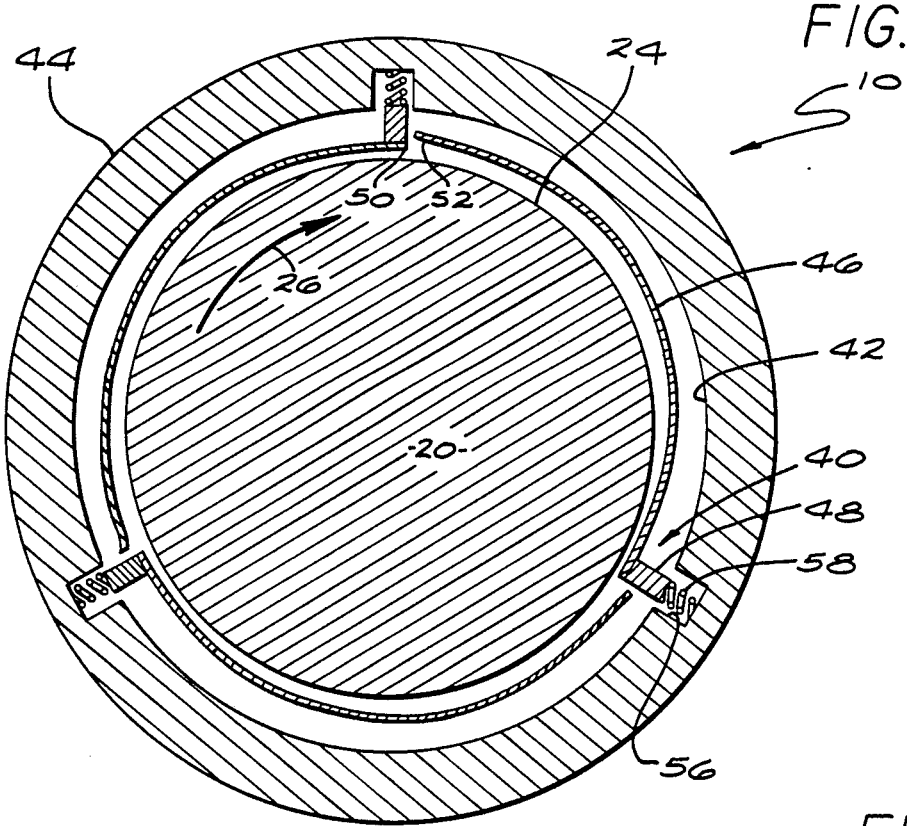
FIG. 1
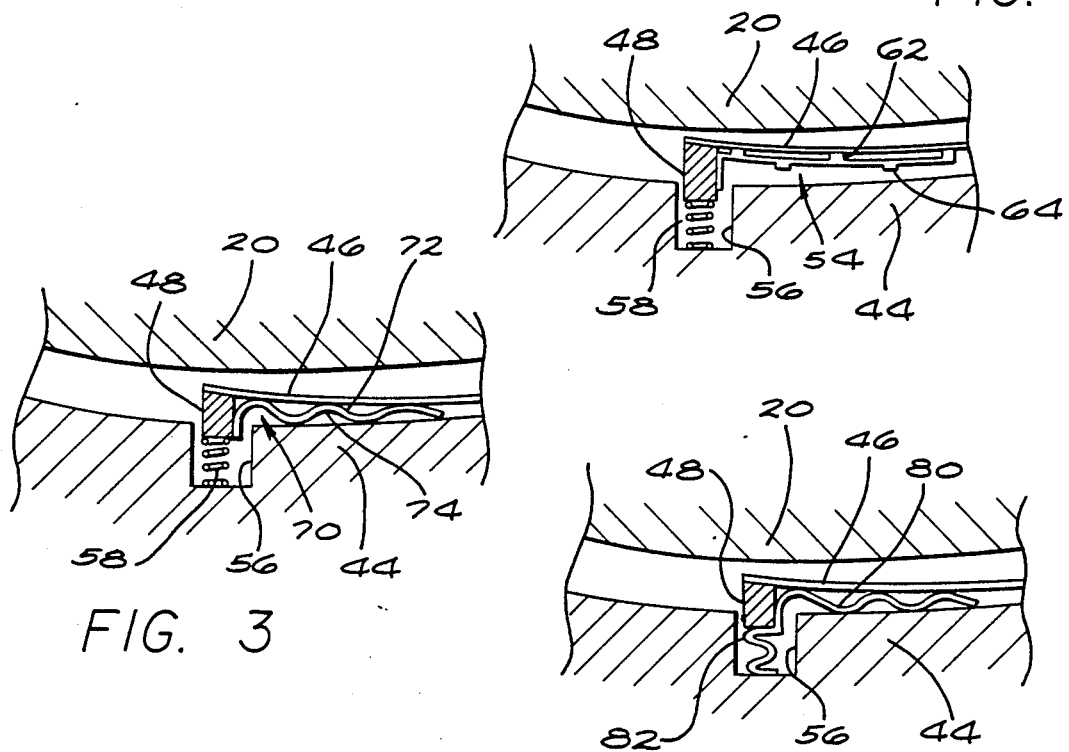
FIG. 2
FIG. 3
FIG. 4

FOIL BEARING

BACKGROUND OF THE INVENTION

Process fluid or gas bearings are now being utilized in an increasing number of diverse applications. These fluid bearings generally comprise two relatively movable elements with a predetermined spacing therebetween filled with a fluid such as air, which, under dynamic conditions forms a supporting wedge sufficient to prevent contact between the two relatively movable elements.

More recently, improved fluid bearings, particularly gas bearings of the hydrodynamic type, have been developed by providing foils in the space between the relatively movable bearing elements. Such foils, which are generally thin sheets of a compliant material, are deflected by the hydrodynamic film forces between adjacent bearing surfaces and the foils thus enhance the hydrodynamic characteristics of the fluid bearings and also provide improved operation under extreme load conditions when normal bearing failure might otherwise occur. Additionally, these foils provide the added advantage of accommodating eccentricity of the relatively movable elements and further provide a cushioning and dampening effect.

The ready availability of relatively clean process fluid or ambient atmosphere as the bearing fluid makes these hydrodynamic, fluid film lubricated, bearings particularly attractive for high speed rotating machinery. While in many cases the hydrodynamic or self-acting fluid bearings provide sufficient load bearing capacity solely from the pressure generated in the fluid film by the relative motion of the two converging surfaces, it is sometimes necessary to externally pressurize the fluid between the bearing surfaces to increase the load carrying capability. While these externally pressurized or hydrostatic fluid bearings do increase the load carrying capacity, they do introduce the requirement for an external source of clean fluid under pressure.

In order to properly position the compliant foils between the relatively movable bearing elements, a number of mounting means have been devised. The most common practice, as exemplified in U.S. Pat. Nos. 3,366,427, 3,375,046 and 3,615,121, is to attach a rod or bar to one end of the foil which can then be retained in a slot or groove in one of the relatively movable bearing elements. Alternately, as exemplified in U.S. Pat. Nos. 3,382,014 and 3,809,433, a plurality of overlapping foils may be individually mounted on a foil base such as by spot welds. The base would then be frictionally held against one of the relatively movable bearing elements. Individual foils may also be fastened directly to one of the movable bearing elements as illustrated in U.S. Pat. No. 4,262,975. Further, a lip or projection at one end of the foil my be restrained in a slot or groove in one of the relatively movable elements. Examples of this type of mounting can be found in U.S. Pat. Nos. 3,511,544, 3,747,997, 3,809,443 and 3,382,014. Individual foils have also been mounted intermediate the ends thereof as described in U.S. Pat. No. 4,178,046.

In order to establish stability of the foils in most of these mounting means, a substantial pre-load is required on the foil, that is, the individual foils must be loaded against the relatively movable bearing element opposed to the bearing element upon which the foils are mounted. It has been conventional to provide separate stiffener elements or underfoils beneath the foil elements to supply this required pre-load as exemplified in U.S. Pat. Nos. 3,893,733 and 4,153,315.

In most applications, the individual foils are mounted at their leading edge as generally illustrated in the aforementioned U.S. patents. There are some instances, however, here it may be desirable or even necessary to mount the individual foils at their trailing edge. Such a mounting is described in U.S. Pat. No. 4,262,975. Bearings of this type, where the trailing edge is rigidly mounted, while insuring a converging tapered or wedge-shaped gap in the direction of movement or rotation, may have difficulty in accommodating centrifugal and/or differential thermal growth between the foils and the movable element.

SUMMARY OF THE INVENTION

Means are provided for the resilient mounting of a trailing edge supported resilient foil. In one embodiment the resilient means are integrated with the stiffener elements or underfoils.

BRIEF DESCRIPTION OF THE DRAWINGS

FIG. 1 is an enlarged sectional view of a foil bearing of the present invention.

FIG. 2 is a sectional view of a portion of an alternate embodiment of the foil bearing of the present invention.

FIG. 3 is a sectional view of a portion of another alternate embodiment of the foil bearing of the present invention.

FIG. 4 is a sectional view of a portion of yet another alternate embodiment of the foil bearing of the present invention.

DETAILED DESCRIPTION OF THE INVENTION

Referring now to the drawings and more particularly to FIG. 1 thereof, a compliant hydrodynamic fluid film journal bearing 10 is shown for supporting a rotating shaft 20. The shaft has a bearing surface 24 and rotates in the direction indicated by arrow 26. The radial load of the shaft 20 is borne by three bearing pad assemblies 40 which are mounted at the inner surface 42 of a journal sleeve 44. The pads 40 are greatly exaggerated in size in FIG. 1 for purposes of clarity. The journal sleeve 44 is usually stationary relative to the machine frame, but in some applications it is advantageous for both the shaft 20 and journal sleeve 44 to rotate; the invention is usable with all forms of relative rotation between them.

Each journal pad assembly 40 is in the form of a curved rectangle or cylindrical segment covering about one-third of the inside surface 42 of the journal sleeve 44. While three pads are illustrated, fewer or more pads can be used. Each pad in the embodiment of FIG. 1 includes a bearing sheet 46 welded or otherwise affixed to the top surface of a mounting block 48 at the trailing edge 50 of the bearing pad in the sense of the rotation of the shaft 20, shown by arrow 26, and is free at the leading edge 52.

The rotation of the shaft 20 in the direction shown by the arrow 26 generates a hydrodynamic fluid film over the bearing pads 40 which supports the shaft and separates it from the bearing sheets 46 of the pad 40. The hydrodynamic fluid film is created by the viscous or shear forces acting in the fluid parallel to the direction of relative movement between the bearing surface 24 of the shaft 20 and the bearing surface of the bearing sheet. The bearing surface 24 of the shaft drags the boundary layer of fluid with it as it rotates over the bearing sheet 46, and the boundary layer in turn drags in the layer of fluid immediately adjacent to it, and in this way a velocity gradient is established in the fluid in the gap between the shaft 20 and the bearing sheet 46. The gap between the bearing sheet 46 and the shaft bearing surface 24 is inherently wedge-shaped causing the pressure of the fluid drawing into the gap to increase toward its narrow end, thus creating the pressurized cushion or fluid film which dynamically supports the rotating shaft 20.

The mounting block 48 is generally positioned with respect to a slot 56 in the inside surface 42 of the journal sleeve 44. Resilient members 58, such as a coil or bent spring, are disposed in the slot 56 to provide resilient support for the mounting block 48 to force the trailing edge 50 of the bearing sheet 46 towards the shaft 20. The resilient member 58 may be a series of individual springs spaced along the length of the slot 56 or may be a single elongated spring which extends the entire length of the slot 56.

As generally illustrated in FIGS. 2 and 3, the bearing sheet 46 of the pad 40 may be supported on a compliant support element or underspring to enable the bearing sheet 46 to conform to the bearing surface 24 of the rotating shaft 20 despite conditions which would otherwise cause permanent or transient skew between the shaft 20 and the journal sleeve 44. The conditions include, among others, bearing or shaft misalignment, thermal distortion, centrifugal growth of the shaft, and rotor runout due to eccentric loads or rotor imbalance. The compliant support element can deflect and recover to support the bearing sheet 46 in correct hydrodynamic relationship to the bearing surface 24 of the rotating shaft 20 despite these conditions.

The resilient support element 54 of FIG. 2 is shown as a thin compliant sheet 60 having a plurality of upper ridges 62 and lower ridges 64 alternately spaced thereon. FIG. 3 illustrates a resilient support element 70 in the form of a corrugated or wavy spring having resilient elevations or ridges 72 separated by valley floors 74. The conformance of the bearing sheet 46 to the bearing surface 24 of the shaft 20 may be facilitated by slitting the resilient support element 54 into a plurality of axially adjacent strips each extending in the direction of the motion of the shaft surface relative to the bearing sheet 46. In either case, the support element 54 or 70 may be fastened to the mounting block 48 underneath the bearing sheet 46 by welding or other mechanical attachment means. The mounting block 48 is resiliently mounted by a plurality of springs 58 within axially extending slots 56 in the inside surface 42 of the journal sleeve 44.

In the alternate embodiment of FIG. 4, the resilient support member 80 is made integral with the resilient member 82 in the slot 56. This helps to position and to maintain the relative spacing of the elements of the bearing 10. In operation, the free leading edge 52 of the bearing 40 will deflect readily under hydrodynamic load and the deflection will decrease toward the more rigid trailing edge 50 which will deflect only by overcoming the force provided by the resilient member 58 under the mounting block 48. The resulting shape is a canted pad profile as shown in FIG. 1.

This canted profile provides highly stable operation for a hydrodynamic fluid film journal bearing. The optimum angle of the pad relative to the shaft bearing surface increases with increasing shaft rotation speed, and this can be accomplished in the embodiment of FIGS. 2–4 by the stiffness gradient of the support elements which causes the pad inclination to increase with increasing rotor rotation speed so the operation of the bearing throughout its speed and load range remains stable. The resilient trailing edge support enables the bearing to readily accommodate centrifugal and/or differential thermal growth between the foils and the other bearing elements, in particular the rotating shaft.

Various alterations and modifications of the foregoing detailed description of the preferred forms of the invention will become apparent to those skilled in the art. Accordingly, this detailed description should be considered as exemplary and not limiting to the scope and spirit of the invention as set forth in the appended claims.

What I claim is:

1. A fluid bearing comprising:
    a first member having an axially extending bore therein;
    a second member rotatably supported within the axially extending bore of said first member; and
    a plurality of spaced compliant foils operably disposed within the axially extending bore of said first member around said second member, said compliant foils including a mounting base at the trailing edge of said foils, the axially extending bore of said first member including a plurality of axially extending slots for receiving said mounting base of said spaced compliant foils; and
    coil springs for providing resilient support of said mounting base of said plurality of compliant foils, said coil springs disposed within the axially extending slots between the base thereof and said mounting base to bias the trailing edge of said foils towards said second member.

2. A fluid bearing comprising:
    a first member having an axially extending bore therein;
    a second member rotatably supported within the axially extending bore of said first member; and
    a plurality of spaced compliant foils operably disposed within the axially extending bore of said first member around said second member, said compliant foils including a mounting base at the trailing edge of said foils, the axially extending bore of said first member including a plurality of axially extending slots for receiving said mounting base of said spaced complaint foils; and
    corrugated springs for providing resilient support of said mounting base of said plurality of compliant foils, said corrugated springs disposed within the axially extending slots between the base thereof and said mounting base to bias the trailing edge of said foils towards said second member.

* * * * *